United States Patent Office 3,265,460
Patented August 9, 1966

3,265,460
DYEING OF SYNTHETIC FIBERS
Robert C. Hoare, Hamburg, N.Y., assignor to Allied Chemical Corporation, New York, N.Y., a corporation of New York
No Drawing. Filed Mar. 22, 1960, Ser. No. 16,636
18 Claims. (Cl. 8—39)

This invention relates to the dyeing of synthetic fibers, the term "dyeing" being used in the broad sense including various methods of application, such as dyeing in a bath, printing, etc. It relates more particularly to the use of a special class of anthraquinone compounds as coloring agents for synthetic fibers containing a plurality of repetitive carbonyl-containing groups, and especially synthetic fibers comprising chains of repetitive groups linked together by carbonyl groups, and to the resulting fibers colored with said anthraquinone compounds.

Representative examples of such synthetic fibers are those formed of cellulose esters, especially cellulose acetates, and particularly cellulose triacetate; those formed of aromatic polyester material of the polyalkylene terephthalate type, especially polyhydric alcohol esters of terephthalic acid, and particularly polyethylene terephthalate; and those formed of polyamides, especially the polyamides characterized as nylons, and particularly those of the type of nylon-6 (derived from epsilon-caprolactam) and nylon-6,6 (derived from hexamethylene adipamide).

It is known that fibers of the above general class can be dyed by means of aqueous dispersions of water-insoluble organic dyes or pigments (so-called "disperse dyes") obtained in various ways. Various classes of organic dyes or pigments have been proposed for this purpose, including water-insoluble anthraquinone compounds, a number of which have been employed for producing blue dyeings and prints on the said fibers.

The anthraquinone compounds heretofore employed have been deficient in one or more of the properties required for satisfactory commercial coloring of the said fibers; such as, color hue, brightness, fastness to light, to washing, and especially to so-called "gas-fading," and resistance to heat treatments (non-sublimation and lack of deterioration), especially the heat treatments employed in resin after-treatments of the colored fibers.

"Gas-fading" is a phenomenon brought about by acid constituents in the atmosphere, and especially those which result from the combustion of coal, fuel gas, gasoline and the like and which usually are present in the atmospheres of urban communities. While anthraquinone compounds are known which give brilliant blue dyeings on synthetic fibers of the above class, which dyeings are resistant to changes caused by the usual agencies of light, washing and the like, in many instances such atmospheres cause fading or dulling of the originally brilliant dyeings.

An object of the present invention is to provide coloring agents for synthetic fibers containing a plurality of repetitive carbonyl-containing groups, and especially for synthetic fibers comprising chains of repetitive groups linked together by carbonyl groups, which color said material in bright shades possessing good fastness properties.

A further object of the present invention is to provide a class of dyestuffs which dye synthetic fibers containing a plurality of repetitive carbonyl-containing groups, and especially synthetic fibers comprising chains of repetitive groups linked together by carbonyl groups, shades which are fast to "gas-fading."

Another object of the present invention is to provide a class of dyestuffs which dye synthetic fibers formed of cellulose esters, aromatic polyester material of the polyalkylene terephthalate type, and polyamides blue shades which are fast to "gas-fading," as well as to light, to washing, to sublimation and to heat treatments.

A more specific object of the present invention is to provide anthraquinone dyestuffs which dye fibers formed of cellulose triacetate, polyethylene terephthalate and nylon blue shades of good fastness properties, especially to the fading action of acid fumes.

Other objects of the present invention in part will be obvious and in part will appear hereinafter.

According to the present invention synthetic fibers containing a plurality of repetitive carbonyl-containing groups, and especially synthetic fibers comprising chains of repetitive groups linked together by carbonyl groups, are colored by means of certain beta-substituted alpha, alpha-dihydroxy-alpha,alpha-diamino-anthraquinones set out more fully below.

I have discovered that the beta-substituted anthraquinones set out more fully below are exceptional coloring agents for synthetic fibers containing a plurality of repetitive carbonyl-containing groups, and especially synthetic fibers comprising chains of repetitive groups linked together by carbonyl groups. I have discovered that said beta-substituted anthraquinones dye said synthetic fibers readily and evenly, and that the resulting blue dyeings possess unusual resistance to acid fumes.

Thus said dyestuffs dye cellulose esters, especially cellulose triacetate fibers (such as the fibers sold under the trademark "Arnel"), polyamides, especially nylon, and highly polymeric linear polyesters obtainable from terephthalic acid or ester-forming derivatives thereof and ethylene glycol, trimethylene glycol, tetramethylene glycol, hexamethylene glycol and decamethylene glycol, and especially polyethylene terephthalate fiber (such as the fibers sold under the trademarks "Dacron," "Terylene" and "Kodel"), in the form of filaments, yarn, and various textile forms, in various nuances of blue, which dyeings are fast to washing, to light, and especially to gas-fading. Moreover, the dyeings have particularly good resistance to sublimation and migration of the dyestuffs on exposure to heat, especially that required in the resin after-treatment procedures.

The said dyes are particularly suitable for the dyeing of these fibers by the pressure dyeing technique, in which the presence of carriers is not essential.

The beta-substituted compounds employed as coloring agents in accordance with the present invention are alpha, alpha-diamino - alpha,alpha-dihydroxy - anthraquinones having, as sole additional substituent in a beta-position, a carbocyclic hydrocarbon radical of 6 to 12 nuclear carbon atoms substituted by one to three substituents in the nucleus, of which at least one (which is preferably in para position) is selected from the group consisting of —OR, —SR and —N(R)$_2$, in which R is selected from the group consisting of hydrogen, lower alkyl and lower hydroxyalkyl, and the others, if present, are selected from the group consisting of halogen, nitro, amino, lower alkyl, lower hydroxyalkyl, lower alkoxy, lower alkylthio, and lower carbalkoxy radicals.

Preferably the said beta-substituent is in ortho-position to a hydroxyl group of the anthraquinone compound.

The amino radicals of the alpha,alpha-diamino-alpha,alpha-dihydroxy-anthraquinones may be alike or different and may be primary amino groups (which are preferred) or secondary amino radicals derived from an alkylamine, a hydroxyalkylamine, an aralkylamine, an arylamine or a carboxyacyl-amine. Those dyestuffs which are derivatives of alpha-alpha-diaminoantharufin or of alpha,alpha-diaminochrysazin or of mixtures of them are preferred.

The preferred dyestuffs of the present invention are characterized by the generula formula

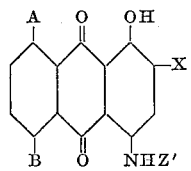

wherein

A and B are different and are selected from the group consisting of —OH and —NHZ;

X represents a carbocyclic hydrocarbon radical of 6 to 12 nuclear carbon atoms substituted in the nucleus (preferably in para position) by a radical selected from the group consisting of OR, SR and $N(R)_2$, and may be additionally substituted by a maximum of two substituents selected from the group consisting of halogen, nitro, amino, lower alkyl, lower hydroxyalkyl, lower alkoxy, lower alkylthio, and lower carbalkoxy radicals;

Z and Z' are the same or different and are selected from the group consisting of hydrogen, alkyl, hydroxyalkyl, aralkyl, aryl and carboxyacyl; and R is selected from the group consisting of hydrogen, lower alkyl and lower hydroxyalkyl.

The coloring, and particularly the dyeing and printing, of synthetic fibers of the type referred to above can be carried out by any of the methods heretofore known for the coloring of such material. It is a feature of the present invention that the beta-substituted alpha,alpha-diamino-alpha,alpha-dihydroxy-anthraquinones employed in accordance with the present invention for the coloring of the said fiber material do not require any special dyeing or printing techniques for their successful application to said material. The said beta-substituted anthraquinones are water-insoluble; accordingly they are applied from aqueous dispersions in the manner of the so-called "dispersed dyes." Thus, they may be applied by the various methods heretofore described as useful for the application to said synthetic fibers of the water-insoluble dyes normally used for the dyeing and printing of said fibers.

For instance, the dyeing of textile fibrous material formed of terephthalate polyesters of the type referred to above is advantageously carried out by working the fibrous material in a dyebath of the beta-substituted anthraquinone, and preferably also containing a dyeing assistant (such as phenol, ortho-phenylphenol, chlorobenzene, benzoic acid, salicylic acid, or mixtures thereof). The dyeing operation is carried out at about 80° to 115° C. and preferably at the boiling temperature or above. By using a closed apparatus, the dyeing can be carried out at superatmospheric pressures and at temperatures above the boiling point at atmospheric pressure. More specific information on methods of dyeing of said fibrous material is disclosed in:

United States Patent 2,833,613;

"Principles of Dyeing 'Dacron' Polyester Fiber," in American Dyestuff Reporter, 41 (1952), 860;

"'Thermosol' Method of Dyeing," in American Dyestuff Reporter, 42 (1953), 1; and "Dyeing of 'Dacron Polyester Fiber—Evaluation of Dyeing Assistants," in Du Pont Technical Bulletin, volume 8, No. 2 (June 1952), p. 69.

Others of the synthetic fibers, such as cellulose triacetate and nylon, similarly can be dyed in the customary manner.

In preparing the dyebath, the beta-substituted anthraquinone dyestuffs are dispersed by any suitable means previously known for the dispersion of dyes used for dyeing ordinary cellulose acetate. Thus, they are generally worked up into an aqueous paste with the aid of a dispersing agent or mixture of dispersing agents (such as, sodium lignin sulfonate or similar sulfite cellulose waste liquor product, formaldehyde condensation products of alkyl naphthalene sulfonates, formaldehyde condensation products of beta-naphthalene sulfonate, polymerized formaldehyde naphthalene sodium sulfonate, etc.). It is usually advantageous to use a mixture of dispersing agents, since no one agent has the desired combination of properties (wetting, dispersing, etc.) which can be obtained by using a suitable mixture. The dispersion is then added to the dyebath, which may or may not contain a dyeing assistant, and the material to be dyed is then entered into the dyebath and worked in the usual manner.

The amount of coloring agent employed will depend upon the depth of coloring desired to be obtained. For example, amounts of the said beta-substituted anthraquinone ranging from 0.025% to 2.5% of the weight of the fiber may be employed for the dyeing of pastel to heavy shades.

The following examples illustrate suitable dyeing procedures. Parts are by weight and temperatures are in degrees centigrade.

DYEING PROCEDURES

*Example A.—Dyeing "Dacron"*

Part I.—One or a mixture of the dyestuffs of the present invention is formed into an intimately mixed, dispersible powder by mixing together the following components:

50 parts of beta-carbocyclic alpha,alpha-diamino-alpha, alpha-dihydroxy anthraquinone
35 parts sodium lignin sulfonate ("Polyfon X TH")
5 parts formaldehyde beta-naphthalene sulfonate condensation product ("Tamol N") and
10 parts sodium sulfate.

The dyestuff is preferably employed in the form of an aqueous press cake, such as that obtained in Example 1 below, in which case an amount of the press cake containing 50 parts of dye solids is employed and no additional water is required. If the dyestuff is employed in the form of a powder, sufficient water is added to permit thorough mixing. When well dispersed, the mass is dried and the dried mass is ground and thoroughly mixed.

Part II.—A dyebath is prepared by bringing a suspension of 10 parts of o-phenylphenol in 500 parts of water to boiling and then adding 0.1 part of the ground and thoroughly mixed dispersible dyestuff powder. "Dacron" polyethylene terephthalate cloth (10 parts) is entered into the dyebath, which is then held at the boil for 1 hour with occasional agitation. The cloth is removed, rinsed in cold water and then scoured for 15 minutes at the boil in 400 parts of a 0.2% aqueous solution of a commercial higher alkylbenzene sodium sulfonate detergent ("Nacconol NR"). The dyed material is rinsed in cold water and dried.

*Example B.—Dyeing nylon*

A dyebath is prepared by mixing 1 part of the ground and thoroughly mixed dispersible dyestuff powder obtained in Example A, Part I, with 10 parts of a 10% aqueous solution of a commercial liquid higher alkylbenzene sodium sulfonate detergent composition ("Nacconol SL") and diluting to 500 parts with hot distilled water. 100 parts of this solution are diluted to 300 parts and the temperature is adjusted to 49° (120° F.). A nylon skein (10 parts) is entered into the dyebath, the temperature of which is slowly raised to boiling (15–20 minutes), and the skein is worked continually for one hour in the boiling bath. The dyed skein is removed, rinsed thoroughly with water, and dried.

*Example C.—Dyeing "Arnel"*

Part I.—A ground and thoroughly mixed dispersible powder of one or a mixture of two or more dyestuffs of the present invention is prepared in a manner similar to that of above Example A, Part I, from the following components:

50 parts of beta-carbocyclic alpha,alpha-diamino-alpha, alpha-dihydroxy anthraquinone
5 parts formaldehyde beta-naphthalene sulfonate condensation product ("Tamol N")
10 parts sodium sulfate and
35 parts sodium lignin sulfonate ("Marasperse N")

*Part II.*—A skein of "Arnel" cellulose triacetate weighing 1 part is entered into 40 parts of an aqueous dyebath containing 0.16 part of methylsalicylate and 0.04 part of "Nacconol NR." The skein is held in this bath for 20 minutes at 60°. Then 0.1 part of the dispersible powder of Part I of this example is added, and the bath is heated to 90°, at which temperature the dyeing is continued for two hours, occasionally agitating the skein in the bath. The dyed skein is removed and rinsed with cold water and then scoured for 20 minutes at 50° in a bath containing 2 parts/1000 of sodium hydroxide
2 parts/1000 of sodium hydrosulfite
2 parts/1000 of "Lissolamine H50"

The skein is rinsed in cold water and then treated for 20 minutes at 60° in an aqueous bath containing 1 part/1000 of hydrogen peroxide and
0.5 part/1000 of "Tamol N."

The resulting dyed skein is rinsed in cold water and heat set at 190°.

Instead of methylsalicylate, other dyeing assistants can be used with equivalent results, e.g. phenylphenol, benzoic acid, chlorobenzene.

The beta-substituted alpha,alpha-diamino-alpha,alpha-dihydroxy-anthraquinones employed as coloring agents in accordance with the present invention can be obtained in various ways, a number of which are known.

Thus they can be prepared according to the method disclosed in U.S.P. 1,652,584; for example, by condensing the boric acid ester of a 4,8-diamino-anthrarufin-2,6-disulfonic acid with a suitable hydroxy-carbocyclic compound, or equivalent, in concentrated sulfuric acid solution; rearranging the condensation product, after neutralization, to the 2-hydroxy(or amino)carbocyclic-6-monosulfo derivative; and removing the 6-sulfo group by treatment with a mild reducing agent (such as sodium hydrosulfite) to produce the desired dyestuff.

These reactions are represented by the following equations:

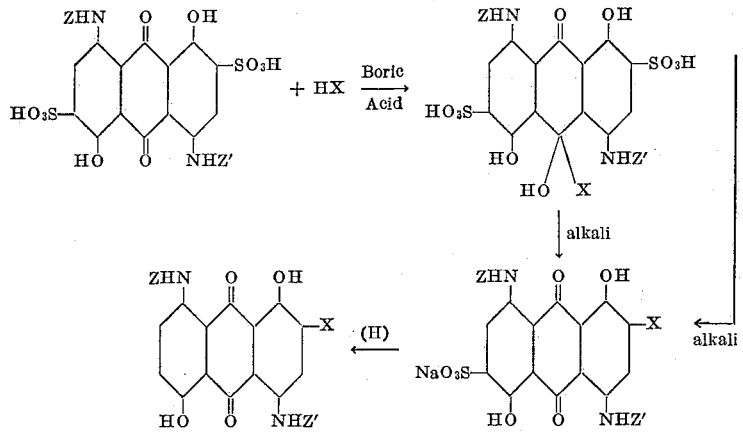

In these general equations, Z, Z′, and X have the meaning ascribed thereto above.

By substituting a 4,5-diamino-chrysazin-2,7-disulfonic acid or a mixture of a 4,8-diamino-anthrarufin-2,6-disulfonic acid and a 4,5-diamino-chrysazin-2,7-disulfonic acid for the 4,8-diamino-anthrarufin-2,6-disulfonic acid, analogous dyestuffs can be prepared.

Various hydroxy-carbocyclic and related carbocyclic compounds can be employed in carrying out said method; for example:

Phenol
Resorcinol
Pyrogallol
Phloroglucinol
Cresols
Xylenols
Alpha-naphthol
Beta-naphthol
Alpha-methoxynaphthalene
4-hydroxy-biphenyl
Cyclohexanol
2-methylcyclohexanol
3-methylcyclohexanol
Anisole
3-methoxy phenol
1,3-diethoxy-benzene
1,2-dimethoxy-benzene
1,2,3-trimethoxy-benzene
1,3,5-trimethoxy-benzene
2-methyl-ethoxy-benzene
3-methyl-ethoxy-benzene
3,6-dimethyl-hydroxyethoxy-benzene
2,6-dimethyl-ethoxy-benzene
2-carbobutoxy-ethoxy-benzene
1,4-dimethoxy-naphthalene
2-nitro-N-methylamino-benzene
N,N-dimethylaniline
N,N-methyl-ethanol-aniline
N,N-diethanolamino-benzene
2-methoxy-aniline
2-acetylamino-anisole
6-chloro-1,3-dimethoxy-benzene
Ethylthiophenyl ether
4,6-dimethoxy-ethylthiophenyl ether
4-methoxy-biphenyl
Carbomethoxy-benzene Mixtures of two or more of said carbocyclic compounds, and especially commercial mixtures of isomeric compounds, also can be used.

The invention will be illustrated by the following specific examples, but it is to be understood that it is not limited to the details thereof and that changes may be made without departing from the scope of the invention. The temperatures are in degree centigrade and the parts and percentages are by weight.

PREPARATION OF BETA-CARBOCYCLIC ALPHA, ALPHA-DIAMINO ALPHA,ALPHA - DIHYDROXY ANTHRAQUINONES

*Example 1*

To a mixture of 800 parts of 100% sulfuric acid and 40 parts of boric acid, 120 parts of water were added dropwise while maintaining a maximum temperature of 70°. The mass was cooled to below 30°, and 80 parts of the sodium salt of 4,8-diamino-2,6-disulfo-anthrarufin were added slowly. The mixture was agitated at 10° to 20° for 2 hours, 40 parts of phenol were added, and the resulting mixture was agitated at 10° to 15° for about 16 hours and then drowned in 3000 parts of 5% aqueous sodium sulfate at below 40°. The drowned mass was rendered just alkaline (pH—7.5) by the addition of aqueous caustic soda (about 870 parts of 50% aqueous NaOH). Thereafter the mass was heated to and maintained at 85°±5° for about an hour. The resultant slurry was filtered and washed with 2% aqueous sodium chloride until the wash liquor was colorless.

The washed filter cake was reslurried in 2000 parts of water and the slurry was heated to 80° to 85°. To this mass, 60 parts of sodium carbonate (soda ash) were added and the mixture was agitated for a quarter hour at 80° to 85°. Then 52 parts of sodium hydrosulfite were added and the mixture was agitated at 80° to 85° for an hour. After the addition of 100 parts of soda ash, the mass was heated to and agitated at 95° to 100° for an hour, while holding the volume constant. The slurry was filtered and washed alkali free with hot water (60°).

The filter cake was reslurried in 1000 parts of water and heated to 80° to 85°. The slurry was rendered just acid to Congo red by the addition of 50° Bé. sulfuric acid, agitated for 1 hour, and then filtered. The filter cake was washed acid-free with hot water.

The resultant dyestuff, 2(p-hydroxyphenyl) - 4,8 - diamino-anthrarufin had the formula:

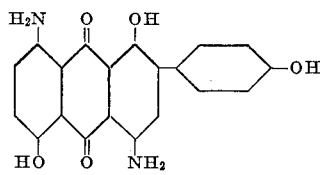

When employed in the manner described above for the dyeing of "Arnel" cellulose triacetate and "Dacron" polyethylene terephthalate, it gave clear greenish blue shades of excellent fastness to light, to washing and to gas fading. The shade on "Dacron" was slightly greener than that on "Arnel." The dyeings were surprisingly resistant to sublimation on exposure to high temperatures for short periods of time.

*Example 2*

The procedure of Example 1 was repeated with 46 parts of anisole instead of the phenol. The resulting 2(p-methoxyphenyl)-4,8-diamino-anthrarufin dyed nylon, "Dacron" and "Arnel" fibers in blue shades of similar fastness properties and somewhat greener hue, as compared with the dyestuff of Example 1.

*Example 3*

The procedure of Example 1 was repeated, using a commercial form of C.I. Acid Blue 45 (New Colour Index No. 63010), containing 40% of 4,8-diamino-2,6-disulfo-anthrarufin, 30% of 4,5-diamino-2,7-disulfo-chrysazin, and the balance essentially a mixture of the 1,6- and 1,7-dihydroxy-anthraquinone derivatives, in the form of their sodium salts, in place of the 4,8-diamino-2,6-disulfo-anthrarufin and using phenetole in place of the phenol.

The resultant dyestuff dyed "Dacron" polyethylene terephthalate fiber greenish blue shades of excellent fastness to light, gas fumes, and sublimation.

*Example 4*

The procedure of Example 1 was repeated with the sodium salt of 4,8-di(methylamino)-1,5-dihydroxy-2,6-disulfo-anthraquinone and phenetole in place of the diamino-disulfo-anthrarufin and phenol, respectively. The resultant dyestuff dyed "Dacron" and "Arnel" fibers reddish blue shades of excellent fastness to gas fading.

The following tabulated Examples 5 to 25 illustrate the dyeing of "Dacron" polyester fiber with additional 2-carbocyclic substituted - 4,8 - diamino-1,5-dihydroxy-anthraquinones in accordance with the present invention. In each case the dyestuff is prepared as set forth in Example 1.

| Example No. | 2-Carbocyclic Substituent | Color of Dyeing on "Dacron" |
|---|---|---|
| 5 | 2',3',4'-trihydroxy-phenyl | Greenish blue. |
| 6 | 2',4'-diethoxy-phenyl | Reddish blue. |
| 7 | 3',4'-dimethoxy-phenyl | Do. |
| 8 | 2',3',4'-trimethoxy-phenyl | Greenish blue. |
| 9 | 2',4',6'-trimethoxy-phenyl | Do. |
| 10 | 3'-methyl-4'-ethoxy-phenyl | Reddish blue. |
| 11 | 2'-methyl-4'-ethoxy-phenyl | Blue. |
| 12 | 2',5'-dimethyl-4'-hydroxyethoxy-phenyl | Reddish blue. |
| 13 | 3',5'-dimethyl-4'-ethoxy-phenyl | Do. |
| 14 | 3'-carbobutoxy-4'-ethoxy-phenyl | Greenish blue. |
| 15 | 4',8'-dimethoxy-naphthyl | Reddish blue. |
| 16 | 3'-nitro-4'-methylamino-phenyl | Dull greenish greyish blue. |
| 17 | 4'-diethanolamino-phenyl | Greenish blue. |
| 18 | 3'-amino-4'-methoxy-phenyl | Reddish blue. |
| 19 | 3'-acetylamino-4'-methoxy-phenyl | Reddish blue (greener than 18). |
| 20 | 5'-chloro-2',4'-dimethoxy-phenyl | Reddish blue. |
| 21 | 4'-ethylthio-phenyl | Do. |
| 22 | 2',4'-dimethoxy-5'-ethylthio-phenyl | Do. |
| 23 | 4'-hydroxy-cyclohexyl | Very reddish blue. |
| 24 | 4''-methoxy-4'-biphenyl | Reddish blue. |
| 25 | 4'-carbomethoxyphenyl | Greener than Example 1. |

From the above illustrative examples, it can readily be seen that a group of dyestuffs especially suitable for coloring synthetic fibers of the above class in blue shades of extremely high fastness to the combined agencies of light, washing, acid gases, and heat has been provided.

It will be understood by those skilled in this art that the above examples are illustrative in character and that variations in the specific details disclosed therein can be made. For example, the dyeing of polyester fibers of the polyethylene terephthalate type can be carried out either by the open-vessel procedure substantially as disclosed or by the pressure vessel procedures involving superatmospheric pressures and elevated temperatures.

Mixtures of two or more of the above dyestuffs can be employed to obtain various modified shades. Further, if desired, the above beta-substituted anthraquinones can be employed in admixture with other known dyestuffs for the said synthetic fibers.

Further, as indicated above, the dyeing of the said synthetic fibers and blends thereof may, and often does, involve the concomitant use of dyeing assistants, dispersing agents, swelling agents, scours and the like. Thus, various other known dyeing assistants, dispersing agents, swelling agents, and the like heretofore employed in the coloring of such fiber material with other "dispersed dyes" can be employed in conjunction with the beta-substituted alpha, alpha - diamino - alpha,alpha - dihydroxy anthraquinones herein disclosed.

I claim:

1. Synthetic fibers containing a plurality of repetitive carbonyl-containing groups colored with an alpha,alpha-diamino-alpha,alpha-dihydroxy-anthraquinone having, as sole additional substituent in a beta-position, a carbocyclic hydrocarbon radical of 6 to 12 nuclear carbon atoms substituted by one to three substituents in the nucleus, of which at least one is selected from the group consisting of —OR, —SR and —N(R)$_2$ in which R is selected from the group consisting of hydrogen, lower alkyl and lower hydroxyalkyl, and the others, when present, are selected from the group consisting of halogen, nitro, amino, lower alkyl, lower hydroxyalkyl, lower alkoxy, lower alkylthio, and lower carbalkoxy radicals.

2. Synthetic fibers selected from the group consisting of cellulose triacetate, polyesters of the polyalkylene terephthalate type, and polyamides dyed with an alpha,alpha-diamino-alpha,alpha-dihydroxy-anthraquinone as defined in claim 1.

3. A dyestuff composition suitable for use in the coloring of synthetic fibers containing a plurality of repetitive carbonyl-containing groups comprising essentially at least one alpha,alpha - diamino - alpha,alpha-dihydroxy-anthraquinone as defined in claim 1 and at least one dispersing agent.

4. A dyestuff composition as defined in claim 3 wherein the diamino-dihydroxy-anthraquinone is 4,8-diamino-1,5-dihydroxy-anthraquinone having in the 2-position, as the sole additional substituent, a benzene hydrocarbon radical having one to three hydroxyl groups as sole substituents, one of which is para to the anthraquinone nucleus.

5. A dyestuff composition as defined in claim 3 wherein the diamino-dihydroxy-anthraquinone is 4,8-diamino-1,5-dihydroxy-anthraquinone having in the 2-position, as the sole additional substituent, a benzene hydrocarbon radical having at least one lower alkoxy radical as sole substituents.

6. A dyestuff composition suitable for use in the coloring of synthetic fibers containing a plurality of repetitive carbonyl-containing groups comprising essentially at least one alpha,alpha - diamino - alpha,alpha-dihydroxy-anthraquinone having, as sole additional substituent in a beta position ortho to one of the hydroxyl groups, a carbocyclic hydrocarbon radical of 6 to 12 carbon atoms having at least one hydroxyl substituent, and at least one dispersing agent selected from the group consisting of sodium lignin sulfonate, formaldehyde condensation products of alkyl naphthalene sulfonates, formaldehyde condensation products of beta-naphthalene sufonate, and polymerized formaldehyde naphthalene sodium sulfonate.

7. A dyestuff composition as defined in claim 6 wherein the diamino-dihydroxy-anthraquinone is 2(4'-hydroxyphenyl)-4,8-diamino-1,5-dihydroxy-anthraquinone.

8. Synthetic fibers selected from the group consisting of cellulose triacetate, polyesters of the polyalkylene terephthalate type, and polyamides dyed with an alpha,alpha-diamino-alpha,alpha-dihydroxy-anthraquinone having, as sole additional substituent in a beta position ortho to one of the hydroxyl groups, a carbocyclic hydrocarbon radical of 6 to 12 carbon atoms having a hydroxyl group in para position to the anthraquinone nucleus.

9. Synthetic fibers as defined in claim 8 dyed with an alpha,alpha-diamino-alpha,alpha-dihydroxy-anthraquinone having, as sole additional substituent in a beta position ortho to one of the hydroxyl groups, a carbocyclic hydrocarbon radical of 6 to 12 carbon atoms having a lower alkoxy radical in para position to the anthraquinone nucleus.

10. Synthetic fibers as defined in claim 8 dyed with an alpha,alpha-diamino-alpha,alpha-dihydroxy-anthraquinone having, as sole additional substituent in beta position ortho to one of the hydroxyl groups, the para-hydroxy-phenyl radical.

11. Synthetic fibers containing a plurality of repetitive carbonyl-containing groups dyed with 4,8-diamino-1,5-dihydroxy-anthraquinone having, in the 2-position, as the sole additional substituent, a carbocyclic hydrocarbon radical of 6 to 12 carbon atoms having at least one hydroxyl group as sole substituents.

12. Synthetic fibers containing a plurality of repetitive carbonyl-containing groups dyed with 4,8-diamino-1,5-dihydroxy-anthraquinone having in the 2-position, as the sole additional substituent, a carbocyclic hydrocarbon radical of 6 to 12 carbon atoms having at least one lower alkoxy radical as sole substituents.

13. Synthetic fibers selected from the group consisting of cellulose triacetate, polyesters of the polyalkylene terephthalate type, and polyamides dyed with 4,8-diamino-1,5-dihydroxy-anthraquinone having in the 2-position, as the sole additional substituent, a benzene hydrocarbon radical having one to three hydroxyl groups as sole substituents, one of which is para to the anthraquinone nucleus.

14. Synthetic fibers as defined in claim 13 dyed with 4,8-diamino-1,5-dihydroxy-anthraquinone having in the 2-position, as the sole additional substituent, a benzene-hydrocarbon radical having one to three lower alkoxy radicals as sole substituents, one of which is para to the anthraquinone nucleus.

15. Polyethylene terephthalate fibers dyed with 2(4'-hydroxy-phenyl) - 4,8 - diamino - 1,5 - dihydroxy-anthraquinone.

16. A dyeing process comprising applying to an artificial fiber material selected from the group consisting of secondary cellulose acetate, cellulose triacetate, and polyethylene terephthalate fibers, from an aqueous dispersion, a member selected from the group consisting of a single anthraquinone dyestuff and a mixture of anthraquinone dyestuffs of the formula

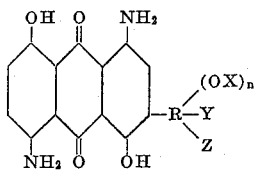

wherein

R represents a member selected from the group consisting of radicals of the benzene, diphenyl and naphthalene series, X represents a member selected from the group consisting of hydrogen, lower alkyl and lower hydroxyalkyl, Y represents a member selected from the group consisting of hydrogen, lower alkyl, alkoxy with 1 to 2 carbon atoms and chlorine provided that the latter stands in an other than the para-position to the —OX-group, Z represents a member selected from the group consisting of hydrogen, lower alkyl and lower alkoxy, and n represents one of the integers 1, 2 and 3.

17. A dyeing process comprising applying to an artificial fiber material selected from the group consisting of secondary cellulose acetate, cellulose triacetate, and polyethylene terephthalate fibers, from an aqueous dispersion, the anthraquinone dyestuff of the formula

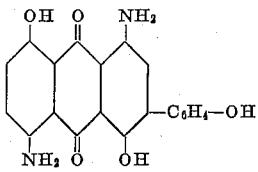

18. A dyeing process comprising applying to an artificial fiber material selected from the group consisting of secondary cellulose acetate, cellulose triacetate, and polyethylene terephthalate fibers, from an aqueous dispersion, the anthraquinone dyestuff of the formula

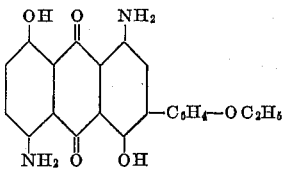

References Cited by the Examiner

UNITED STATES PATENTS

| | | | |
|---|---|---|---|
| 2,757,064 | 7/1956 | Speck | 8—39 |
| 2,833,613 | 5/1958 | Hallada et al. | 8—55 |
| 2,918,344 | 12/1959 | Jenny | 8—39 |
| 2,922,691 | 1/1960 | Grossman | 8—39 |
| 2,967,752 | 1/1961 | Bucheler | 8—39 X |
| 2,993,917 | 7/1961 | Weinstein et al. | 8—39 X |
| 3,043,646 | 7/1962 | Buecheler | 8—40 |

NORMAN G. TORCHIN, *Primary Examiner.*

MORRIS O. WOLK, *Examiner.*

J. HERBERT, *Assistant Examiner.*